July 26, 1955     A. GENTILE     2,714,036
RAIN SHIELD ATTACHMENT FOR VEHICLE SUN VISORS
Filed May 1, 1953
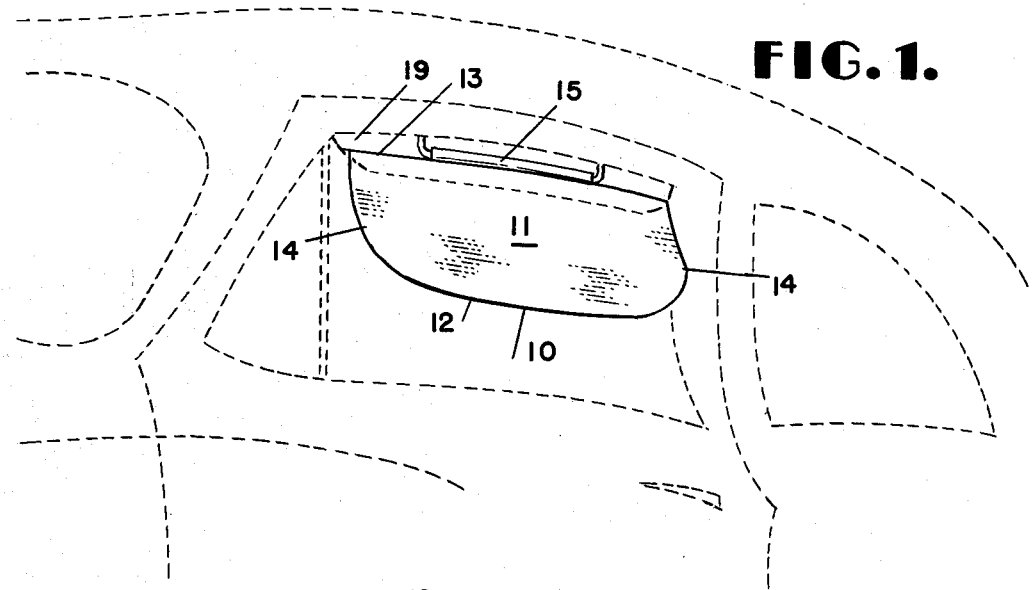
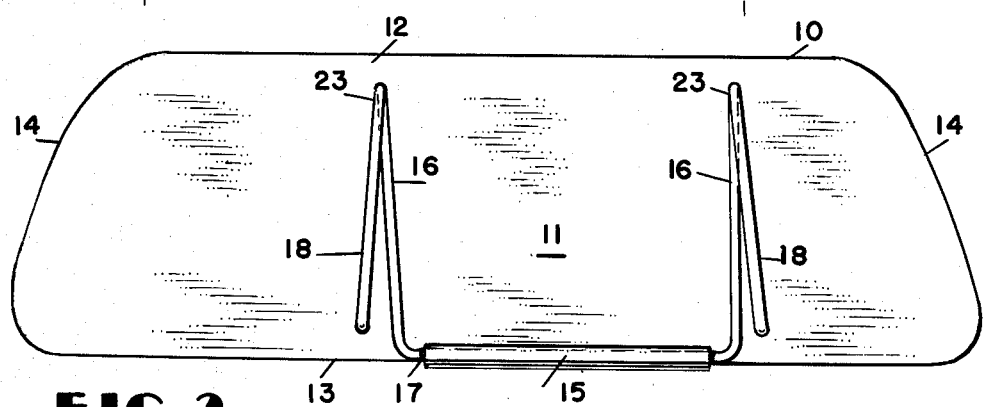
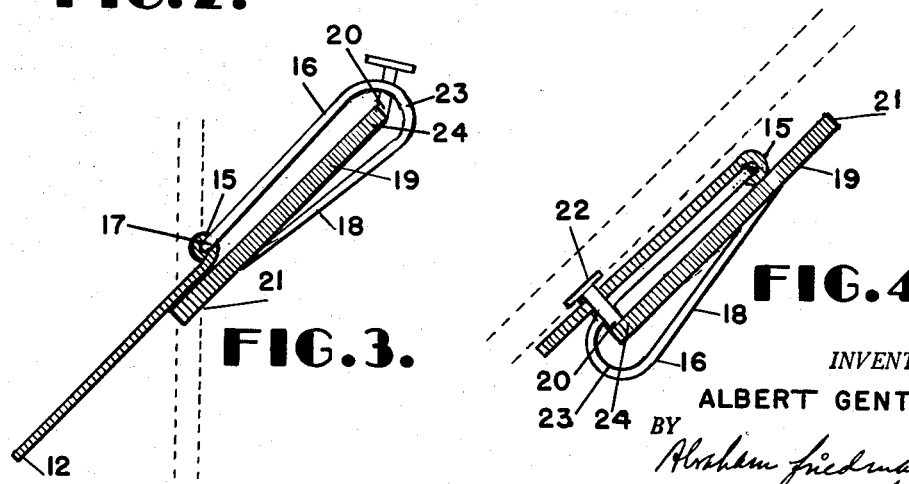
INVENTOR.
ALBERT GENTILE
BY Abraham Friedman
Atty.

2,714,036
RAIN SHIELD ATTACHMENT FOR VEHICLE SUN VISORS

Albert Gentile, Brooklyn, N. Y.

Application May 1, 1953, Serial No. 352,369

4 Claims. (Cl. 296—97)

This invention relates to a rain shield and more particularly to a rain shield adapted to be detachably secured to the sun visor of a motor vehicle.

Some of the objects of this invention are to provide a simple, efficient, economical and readily producible rain shield adapted to be mounted upon the sun visor of a motor vehicle which is capable of being readily put into operational position by swinging said visor from its normal position to a position parallel with the side of the motor vehicle and thus prevent the entry of rain into a motor vehicle through an open side window thereof all without interfering with the appearance and utility of said visor.

Other and further objects, benefits and advantages of this invention will become apparent from the description thereof contained in the annexed drawings, specifications and claims, or will otherwise become obvious. It will be understood that the invention herein disclosed may be used for other purposes for which the structure and arrangement are adapted.

In the accompanying drawings:

Figure 1 illustrates the invention in operational position, the rain shield extending from the side window of a motor vehicle which is indicated by the broken lines;

Figure 2 is a plan view of an embodiment of this invention.

Figure 3 is a side view of the device in operational position extending from the side window of a motor vehicle; and Figure 4 is a side view of the device as it appears in relation to the roof of a motor vehicle when not in use.

As shown in Figures 1 and 2 of the accompanying drawings, the instant invention comprises a rain shield designated generally by the numeral 10 which is comprised of a rain deflecting panel 11 which may be of metal, plastic or other similar material. It is preferred to form panel 11 of transparent plastic material although it may be formed of an opaque or translucent material. Panel 11 is elongated and substantially rectangular in form, having parallel front and rear side edges 12 and 13 respectively and forwardly inclined end edges 14. A sleeve 15 is provided along a portion of rear edge 13. Said sleeve may advantageously be formed integrally by turning a portion of the material from which the panel is formed upon itself so as to form a cylindrical tube thereby constituting said panel into one leaf of a hinge as will more clearly appear hereafter. The rain shield 10 is mounted upon a sun visor by means of clip 16. Said clip may advantageously be formed of spring wire or other similar, suitable material. The body portion 17 of said wire is passed through sleeve 15 and the end portions of said wire are bent substantially at right angles with respect to the longitudinal axis of sleeve 15. By further bending the end portions of said wire upon themselves, open ended U-shaped clip arms 18 are formed. The entire arrangement is such that panel 11 forms one leaf of a hinge and clip element 16 forms the other leaf of the hinge. A pivotal connection is thus provided between rain deflecting panel 11 and clip element 16.

The device is mounted upon the sun visor in the manner illustrated more clearly in Figures 1 and 4.

It should be borne in mind that the conventional type of sun visor employed in the large majority of present day motor vehicles comprise a substantially rectangular panel 19 of opaque material. Longitudinal side edge 24 of the panel is provided with a pivot bar 20 which extends a short distance beyond the end edge of panel 19, the end of said bar 20 adjacent the side of the vehicle being bent at right angles and secured to a suitable bracket or mounting 22 secured to the interior of the vehicle. As heretofore stated, panel 19 is capable of up and down rotational movement to permit it to be rotated from its inoperative or stored position shown in Figure 4 to its sun obscuring position substantially parallel with the plane of the windshield. Panel 19 is also usually capable of being moved along bar 20 so as to enable the operator to position it at various points. Additionally bracket 22 provides a pivotal connection for the end of bar 20 so that the visor may be moved from its position parallel with the windshield to a position parallel with the side of the motor vehicle.

The rain shield assembly comprising the present invention is mounted upon the sun visor by passing the front side edge 21 thereof through the open ends of clip arms 18. The base or bight portions 23 of arms 18 are thus brought into juxtaposition with edge 24 of the visor. It should also be noted that clip arms 18 are shorter than the width of the visor and that the hinge or pivot point of shield 10 is therefore positioned inwardly of edge 21 of the visor. As shown in Figure 4 the sun visor 19 is in its upwardly pivoted or normal position as when not in use and rests parallel with a portion of the sloping roof of the interior of the vehicle. The rain shield is mounted on the visor in hinge closed position; the rain deflecting panel 11 resting upon and being almost completely obscured from view of the occupants by the visor panel.

The rain shield is placed into operation by swinging the visor downwardly thus exposing panel 11 and permitting the panel to be pivotally moved in the manner of a hinge so that its rests in a plane substantially parallel with and forms an extension of the visor. The visor is then swung upon its bracket mount from its position parallel with the windshield to a position substantially parallel with the side of the motor vehicle. In so doing the rain shield is carried by the visor so that its projects through an open side window of the vehicle and forms a rain deflecting shield for the open window as may be more clearly seen in Figures 1 and 3. In view of the manner in which the conventional visor is mounted for selective positioning along its pivot bar, adjustment of the shield to register with the window opening may be achived by moving the visor to an appropriate position. In the absence of such adjustment or in lieu thereof the shield assembly may be moved along the visor into registration with the window opening. It should additionally be noted that a portion of the visor extends below the body of the rain deflecting panel so that a portion of the rain deflecting panel rests upon and is directly supported by the visor panel. The arrangement thus provides a firm support for the shield panel when said panel is in operative or extended position. This feature is particularly important when the motor vehicle is in motion and the arrangement is subjected to considerable vibration.

I have here shown and described a preferred embodiment of my invention. It will be apparent, however, that this invention is not limited to this embodiment

I claim:

1. A rain shield adapted to be attached to a motor vehicle sun visor of the type pivotally mounted along one of its longitudinal side edges and capable of movement from a position substantially parallel with the plane of the windshield of said vehicle to a position substantially parallel with the side of said vehicle, said shield comprising a panel of rain impervious material, U-shaped clips having a bight portion and arms extending from said bight portion, said clips being hingedly secured along one of the longitudinal side edges of said panel at one of their free ends, said clips being adapted to frictionally engage with and encompass said sun visor, the bight of said arms being located adjacent said pivoted edge of said visor and said hinged connection being located remotely therefrom.

2. In combination with the sun visor of a motor vehicle, said sun visor being capable of up and down pivotal movement as well as front to side pivotal movement with relation to the front windshield and side door of a motor vehicle, a rain shield, said rain shield comprising a panel of rain deflecting material, U-shaped spring clips pivotally secured along the side edges of said panel, said clips being adapted to receive the body of said sun visor for mounting said shield thereon whereby said rain shield when mounted upon said visor is projected through the door opening of a motor vehicle upon the front to side pivotal movement of said visor.

3. In combination with a sun visor of a motor vehicle comprising a substantially rectangular panel of opaque material, a pivot bar secured along one longitudinal edge of said visor, the end of said bar adjacent the side of said motor vehicle extending substantially normal thereto, said extension being pivotally mounted on the body of said motor vehicle whereby said visor is adapted to be rotated about an axis parallel to the plane of said visor and also to be pivotally moved about an axis normal to the plane of said visor from a position parallel with the windshield of said motor vehicle to a position parallel with the side thereof, a rain shield adapted to be detachably secured to said visor, said rain shield comprising a substantially rectangular sheet of rain impervious material, a sleeve formed along one side edge of said shield, a hinge bar positioned with said sleeve, substantially U-shaped clip members having a bight portion and arms extending from said bight portion, one of the arms of each of said clips being secured to the extremities of said bar, said clip members being adapted to encompass said visor to thereby support said rain shield thereon, the bight portion of said clips being located in juxtaposition with the rotatably mounted longitudinal edge of said visor, the free ends of said clips bearing resiliently against the body of said visor, said shield when mounted upon said visor being projectable through the open side window of the motor vehicle upon the pivotal movement of said visor from its position parallel with the rain shield to its position parallel with the side of the said motor vehicle.

4. In combination with a sun visor of a motor vehicle comprising a substantially rectangular panel of opaque material, a pivot bar secured along one longitudinal edge of said visor, the end of said bar adjacent the side of said motor vehicle extending substantially normal thereto, said extension being pivotally mounted on the body of said motor vehicle whereby said visor is adapted to be rotated about an axis parallel to the plane of said visor and also to be pivotally moved about an axis normal to the plane of said visor from a position parallel with the wind shield of said motor vehicle to a position parallel with the side thereof, said visor being mounted upon said pivot bar for longitudinal sliding movement whereby said visor may be selectively positioned along said pivot bar, a rain shield adapted to be detachably secured to said visor, said rain shield comprising a substantially rectangular sheet of rain impervious material, a sleeve formed along one side edge of said shield, a hinge bar positioned with said sleeve, the end edges of said shield converging with each other, substantially U-shaped clip members having a bight portion and arms extending from said bight portion, one of the arms of each of said clips being secured to the extremities of said bar, said clip members being adapted to encompass said visor to thereby support said rain shield thereon, the bight portion of said clips being located in juxtaposition with the rotatable longitudinal edge of said visor, the free ends of said clips bearing resiliently against the body of said visor, said shield when mounted upon said visor being adapted to be projected through the open window at the side of the motor vehicle upon the pivotal movement of said visor from its position parallel with the rain shield to its position parallel with the side of said motor vehicle, said sleeve being positioned inwardly of the free longitudinal edge of said visor so that a portion of said shield rests upon and is supported by said visor in projected position.

References Cited in the file of this patent

UNITED STATES PATENTS

| | | |
|---|---|---|
| Des. 149,104 | Baratelli | Mar. 30, 1948 |
| 1,754,339 | Swan | Apr. 15, 1930 |
| 1,900,097 | Clark | Mar. 7, 1933 |
| 2,231,641 | Schwab | Feb. 11, 1941 |
| 2,254,647 | Gallagher | Sept. 2, 1941 |